Dec. 13, 1932.  V. G. APPLE  1,890,802
AUTOMATIC MOLDING METHOD AND MACHINE
Filed Sept. 21, 1929
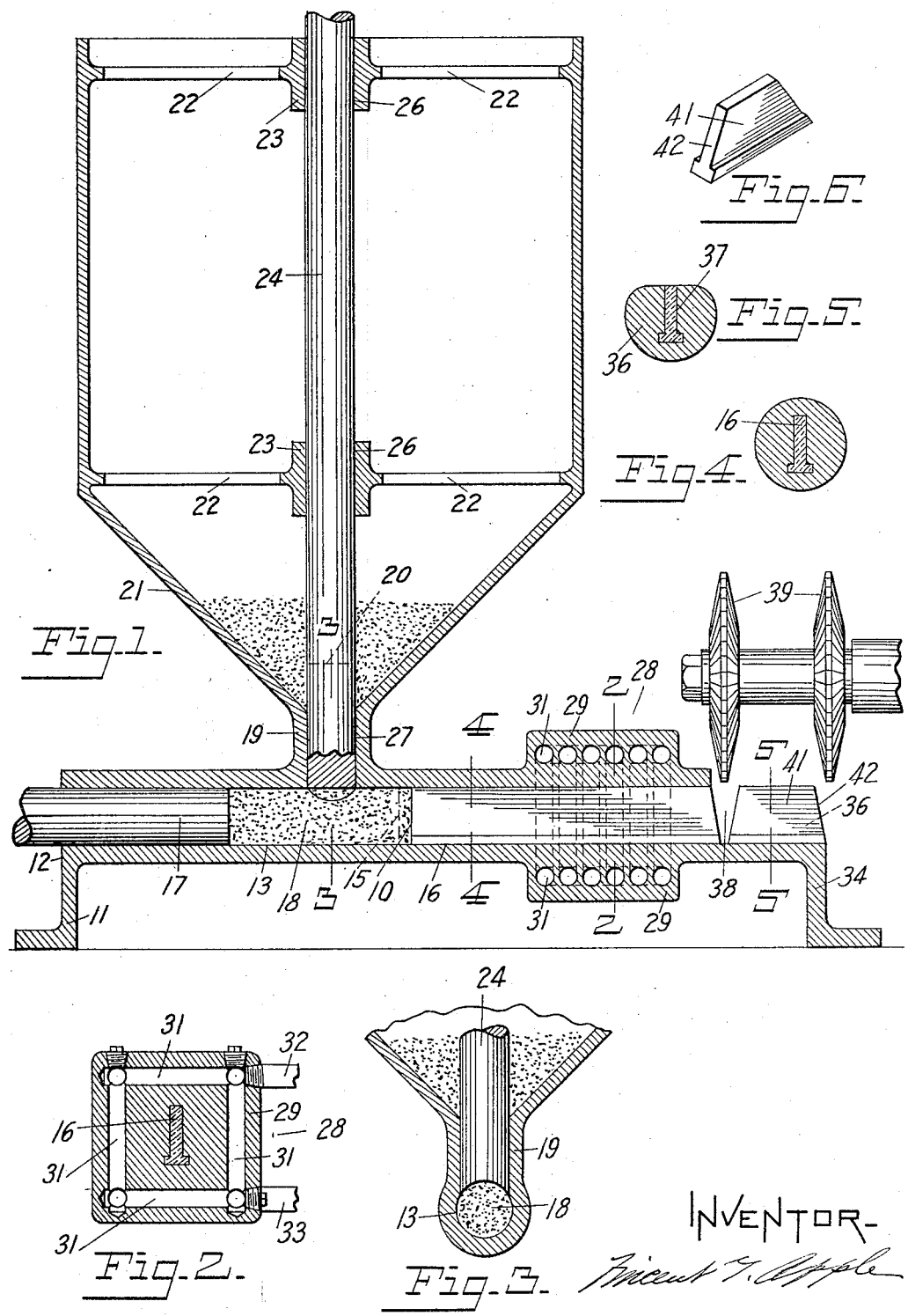

Patented Dec. 13, 1932

1,890,802

UNITED STATES PATENT OFFICE

VINCENT G. APPLE, OF DAYTON, OHIO

AUTOMATIC MOLDING METHOD AND MACHINE

Application filed September 21, 1929. Serial No. 394,340.

This invention relates to plastic molding and particularly to a method and machine for molding shapes which are of uniform cross sectional area throughout their length.

The object of the invention is to devise means and a method to mold such shapes continuously and automatically with substantially no manual effort.

I attain this object by providing and using the machine illustrated and described in the following specification, reference being had to the accompanying drawing, wherein—

Fig. 1 is a vertical section through the machine.

Figs. 2, 3, 4 and 5 are transverse sections taken at 2—2, 3—3, 4—4 and 5—5 respectively of Fig. 1.

Fig. 6 is a perspective view of a molded part made according to my invention.

Similar numerals refer to similar parts throughout the several views.

In the drawing, which is more or less schematic, the frame 11 has an opening varying in cross sectional contour but extending through its entire length. From the end 12 to the line 10 this opening its cylindrical, and for convenience of illustration may be designated the molding cylinder 13, but for the remainder of the way it has a T-shaped cross sectional contour (see Fig. 4), which for convenience, we may designate the die 16, and which corresponds to the cross sectional contour of the article to be molded.

The molding plunger 17 is slidably fitted to the molding cylinder 13 and is normally positioned to leave a stock chamber 18 to receive a molding charge but is operable by means not shown from the position shown to the broken line 15. A neck 19 extends upwardly from frame 11 above the stock chamber 18 and supports the hopper 21.

Hopper 21 has arms 22 extending inwardly to support hubs 23, which are axially aligned with neck 19 so that measuring plunger 24, slidably fitted to openings 26 of hubs 23, may extend downwardly into the opening 27 of neck 19 keeping it normally closed, as shown, though at a certain period in the cycle of operation it is moved upwardly, by means not shown, to the broken line 20.

Surrounding the T-shaped opening 16 near the outer end is a heating unit 28 comprising an enlarged portion 29 through which a series of interconnected holes 31, adapted to carry a heating medium, extend. Pipes 32 and 33 (see Fig. 2) are provided to carry the heating medium to and from the unit.

At the extreme end 34 of frame 11 is the guide 36. The cross sectional contour 37 of this guide is substantially a duplicate of the die 16, Fig. 4, except that it is open at the top (see Fig. 5). A somewhat V-shaped cut 38 separates the die 16 and the guide 36. The cut 38 provides a clearance for the cutter 39, which at a certain point in the cycle of operations is operated by means not shown to the bottom of the cut 38. Another cutter 39 is spaced apart from the first at such distance as the length of the moldings 41, see Fig. 6, which are being produced, require, the beveled sides of the cutters corresponding to the beveled ends 42 of the molding.

When the machine is operating, the hopper 21 is kept filled with the plastic molding compound and the heating medium is circulated through the heating unit 28. To operate the machine through a complete cycle, the measuring plunger 24 is raised until its lower end comes to the broken line 20, whereupon the loose molding compound flows from hopper 21 through opening 27 in neck 19 until the stock chamber 18 is filled, the measuring plunger 24 then descends to the position shown in the drawing, the plunger 17 moves forward until its end reaches the broken line 15, the saws 39 descend and return, then the plunger 17 returns to its starting point, which completes the cycle.

The machine is preferably so constructed that the foregoing steps are performed automatically one after the other to complete a cycle and to repeat the cycle as often as desired, and since mechanism to so perform and repeat said steps is within the skill of any competent mechanic none is herein shown, the novelty residing not as much in the automatic working of the machine as in the idea of pressure molding parts in a die which has no bottom except as the part last molded supplies a bottom against which the part being molded is pressed, the frictional resistance of the cured part to forward movement retarding said movement always until the succeeding charge is fully compressed against it, whereupon the cured part yields and is moved out of the heated part of the die by the newly compressed part as it comes in to be in turn cured.

While the embodiment of my invention herein shown is adapted to produce insulation strips for spacing commutator segments, such strips being preferably beveled at the ends as shown, requiring that the saws have beveled sides, other adaptations may be for producing parts with straight ends requiring saws with straight sides, and while the die shown is of a T-shaped cross section, the dies may be of any cross sectional shape within the capacity of the machine.

Having disclosed an embodiment of my invention, I claim—

A continuously operable machine for forming a loose thermo plastic molding compound into parts of uniform cross section and of an exact length, comprising, in combination, a hollow cylinder having at one end an internal cross section corresponding to the cross section of the part to be molded, means to heat the part within said end to cure said part, a plunger in the other end slidably fitted and endwise movable a predetermined distance to compact a quantity of said loose compound exactly sufficient to form one of said parts and to force the part previously formed from the end of the cylinder, a hopper containing a supply of the molding compound above said cylinder forward of the end of said plunger and connected by a cylindrical opening to said cylinder, a vertically withdrawable plunger in said opening operable upwardly to admit to said cylinder a volume of said compound sufficient for one of said parts then downwardly to confine said volume to said cylinder, and two intermittently operable saws operable intermediate the movements of said plunger to cut said parts to an exact length, the one saw positioned to separate the cured part from the part being cured and the other positioned to slightly trim off the free end.

In testimony whereof I affix my signature.

VINCENT G. APPLE.